United States Patent

Agrawal et al.

[19]

[11] Patent Number: 5,842,200
[45] Date of Patent: Nov. 24, 1998

[54] SYSTEM AND METHOD FOR PARALLEL MINING OF ASSOCIATION RULES IN DATABASES

[75] Inventors: Rakesh Agrawal; John Christopher Shafer, both of San Jose, Calif.

[73] Assignee: International Business Machines Corporation, Armonk, N.Y.

[21] Appl. No.: 500,717

[22] Filed: Jul. 11, 1995

Related U.S. Application Data

[63] Continuation-in-part of Ser. No. 436,794, May 8, 1995, Pat. No. 5,615,341, and Ser. No. 415,006, Mar. 31, 1995, Pat. No. 5,794,209.

[51] Int. Cl.[6] .................................................. G06F 17/30
[52] U.S. Cl. .................................... 707/1; 364/400; 707/3
[58] Field of Search ................................... 364/400, 554; 395/201, 210, 601, 603, 899; 705/1, 10; 707/1, 3

[56] References Cited

U.S. PATENT DOCUMENTS

| | | | |
|---|---|---|---|
| 4,811,199 | 3/1989 | Kuechler et al. | 395/603 |
| 5,642,521 | 6/1997 | Kiuchi et al. | 395/601 X |
| 5,666,524 | 9/1997 | Kunkel et al. | 395/603 |

OTHER PUBLICATIONS

R. Agrawal et al., "Mining Association Rules Between Sets of Items in Large Databases", Proc. 1993 ACM SIGMOD Conf., pp. 207–216, 1993.

R. Agrawal et al., "Fast Algorithms for Mining Association Rules", Proceedings of the 1994 VLDB Conference, pp. 487–499, 1994.

M. Houtsma et al., "Set–Oriented Mining for Association Rules in Relational Databases", Proc. 11th Conference on Data Engineering, pp. 25–33, 1995.

H. Mannila et al., "Improved Methods for Finding Association Rules", Pub. No. C–1993–65, 20 pages, Univ. Helsinki, 1993.

D.J. DeWitt et al., "The Gamma Database Machine Project", IEEE Trans. Knowledge & Data Engineering, Mar., 1990.

J.S. Park et al., "Efficient Parallel Data Mining for Association Rules", IBM Research Report, 26 pgs., R20156, Aug., 1995.

J.S. Park et al., An Effective Hash Based Algorithm for Mining Association Rules', Proc. ACM–SIGMOD Conf. On Management of Data, San Jose, May, 1994.

*Primary Examiner*—Edward R. Cosimano
*Attorney, Agent, or Firm*—Baker Maxham Jester & Meador

[57] ABSTRACT

A multiprocessor including a plurality of processing systems is disclosed for discovering consumer purchasing tendencies. Each processing system of the multiprocessor identifies consumer transaction itemsets that are stored in a database that is distributed among the processing systems and which appear in the database a user-defined minimum number of times, referred to as minimum support. Then, the system discovers association rules in the itemsets by comparing the ratio of the number of times each of the large itemsets appears in the database to the number of times particular subsets of the itemset appear in the database. When the ratio exceeds a predetermined minimum confidence value, the system outputs an association rule which is representative of purchasing tendencies of consumers.

19 Claims, 8 Drawing Sheets

SYSTEM AND METHOD FOR PARALLEL MINING OF ASSOCIATION RULES IN DATABASES

CROSS REFERENCE TO RELATED APPLICATIONS

This application is a continuation-in-part of the following co-pending U.S. Patent Applications, which are commonly assigned with this application:

U.S. patent application Ser. No. 08/415,006, filed Mar. 31, 1995, for "SYSTEM AND METHOD FOR QUICKLY MINING ASSOCIATION RULES IN A DATABASE" now U.S. Pat. No. 5,794,209.

U.S. patent application Ser. No. 08/436,794, filed May 8, 1995, for "SYSTEM AND METHOD FOR MINING GENERALIZED ASSOCIATION RULES IN A DATABASE", now U.S. Pat. No. 5,615,341.

This application claims priority from and incorporates by reference the above-referenced patent applications.

BACKGROUND OF THE INVENTION

1. Field of the Invention

The present invention relates generally to data processing, and more particularly to computer database mining.

2. Description of the Related Art

As discussed in the above-referenced patent applications, knowledge of consumer purchasing tendencies can provide invaluable marketing information for a wide variety of applications. Accordingly, the above-referenced applications disclose systems and methods for mining large databases of consumer transactions to ascertain consumer purchasing tendencies, i.e., to mine transaction databases for useful association rules between items in the database.

To illustrate, it would be helpful for a retailer of automotive parts and supplies to be aware of an association rule which might indicate that consumers who purchase automobile batteries and battery cables also purchase 90% of battery post brushes and battery post cleaner sold by the retailer. In this regard, the purchase of posts or cleaner is the "consequent" of the purchase of a battery. As was the case with the above-referenced applications, however, although this discussion focusses on the marketing applications of the present invention, the principles of the present invention, are useful in many other areas, e.g., business and science.

It happens that with the advent of modern technology, compiling large databases of consumer transactions has become possible. Hence, mining such databases for useful information has received attention. Such mining becomes increasingly problematic as the size of databases grows to the gigabyte and indeed the terabyte range.

Accordingly, the above-referenced applications disclose single-processor systems and methods for rapidly mining large databases for association rules. Such rapid mining is desirable, because many iterations of the mining process might be necessary depending upon the circumstances. For example, it might be desirable to mine a large database every time the database is updated, and a database might be updated daily or even more frequently. Or, it might be desirable to conduct several mining evolutions with varying input parameters, e.g., it might be desirable to mine a database a multiplicity of times using various combinations of the minimum support and minimum confidence input values disclosed in the above-referenced applications.

As recognized herein, efficiencies in mining databases in addition to the efficiencies realized by the inventions disclosed in the above-referenced applications can be realized by using parallel processing to implement the methods previously disclosed. Accordingly, it is an object of the present invention to provide a system and method for quickly mining large databases which uses a plurality of processors cooperating in parallel. Another object of the present invention is to provide a system and method for discovering association rules in itemsets that are stored in a transaction database, with the database and/or the processing thereof being distributed among a plurality of processors. Yet another object of the present invention is to provide a system and method for quickly mining large databases which is easy to use and cost-effective.

SUMMARY OF THE INVENTION

The invention employs a multiprocessor to discover association rules in a transaction database which is distributed among the individual processors of the multiprocessor. The individual processors cooperate in processing the transaction database in parallel with each other and, hence, efficiently discover association rules in the transaction database.

It is contemplated that this invention may be embodied in a critical machine component that causes the multiprocessor to perform method steps to discover association rules in a transaction database. Importantly, the machine component may be realized in a computer program product for effecting parallel processing to discover of association rules in a large, distributed transaction database.

The invention identifies frequently recurring itemsets in transactions which are stored in a transaction database. The transaction database is distributed among a first local database that is associated with a first digital processing system and at least a second local database that is associated with a second digital processing system.

According to the invention, the first digital processing system determines the number of times a candidate itemset appears in the first local database to establish a local count for the candidate itemset. Also, the first digital processing system uses the local count to determine whether the number of times a candidate itemset appears in the transaction database exceeds a predefined minimum support value. Next, the first digital processing system enters a candidate itemset into a set of large itemsets when the number of times exceeds a predetermined minimum support value, such that the set of large itemsets can be designated as frequently occurring itemsets in transactions.

For at least some of the itemsets in the set of large itemsets, the number of times selected subsets of the itemsets appear in the transaction database may be determined. An association rule is output when the ratio of the number of times a selected subset appears in the transaction database to the number of times the associated itemset appears in the transaction database exceeds a predetermined minimum confidence value and thereby satisfies a minimum confidence constraint.

In one preferred embodiment, referred to herein as "Count Distribution", the method steps further include, after establishing the local count, exchanging the local counts with the at least second processing system such that each processing system determines whether the number of times a candidate itemset appears in the transaction database exceeds the predefined minimum support value.

In another embodiment, referred to herein as "Data Distribution", the transaction database is distributed among n processing systems, and the method steps further include generating the candidate itemsets by concatenating itemsets in the set of large itemsets in accordance with a predetermined concatenation regime. In the Data Distribution embodiment, each of the processing systems is associated with a respective set of 1/n candidate large itemsets, and remote portions of the transaction database are received by each processing system from the other processing systems in the multiprocessor. Each processing system establishes its respective local counts by alternatingly determining the number of times one or more of the 1/n candidate large itemsets appear in the respective local database and in the remote portions of the transaction database.

Additionally, the Data Distribution embodiment contemplates establishing n−1 receive buffers for receiving the remote portions of the transaction database. The local counts are established by determining the number of times one or more of the 1/n candidate large itemsets appear in the remote portions of the transaction database when a receive buffer is full, and otherwise determining the number of times one or more of the 1/n candidate large itemsets appear in the respective local database. Moreover, a candidate itemset is entered into a local set of large itemsets when the respective local count exceeds a predetermined minimum support value, and the local set of large itemsets is transmitted to the other processing systems. Further, respective remote sets of large itemsets are received from the other processing systems, and the sum of the local set and the remote sets are determined to establish a global set of large itemsets.

In still another embodiment, referred to herein as "Candidate Distribution", the transaction database is distributed among n processing systems and the method steps include generating a global set G of large itemsets and partitioning the global set G among the n processing systems. Consequently, a local set $G^i$ comprising approximately G/n large itemsets is distributed to each system, with each local set $G^i$ being disjoint from the other local sets. Each system establishes the local count using its associated local set $G^i$.

In another aspect of the present invention, a digital multiprocessor includes a plurality of processing systems. Each processing system includes a respective local database having data of a transaction database of itemsets purchased in consumer transactions. Additionally, each processing system includes means for determining the number of times a candidate itemset appears in the associated local database to establish a local count for the candidate itemset. Also, each processing system includes means for using the local count to determine whether the number of times a candidate itemset appears in the transaction database exceeds a predefined minimum support value. And, means are provided for entering a candidate itemset into a set of large itemsets when the number of times exceeds a predetermined minimum support value, such that the set of large itemsets can be designated as frequently occurring itemsets in transactions.

In yet another aspect, a computer-implemented method is disclosed for identifying frequently recurring itemsets in transactions which are stored in a transaction database. As intended by the present invention, the transaction database is distributed among a first local database associated with a first digital processing system and at least a second local database associated with a second digital processing system. The present method includes determining the number of times a candidate itemset appears in the first local database to establish a local count for the candidate itemset, and exchanging the local counts with the at least second processing system. The present method further includes using the local count to determine whether the number of times a candidate itemset appears in the transaction database exceeds a predefined minimum support value. A candidate itemset is entered into a set of large itemsets when the number of times exceeds a predetermined minimum support value.

Moreover, in accordance with the present method, for at least some of the itemsets in the set of large itemsets, the number of times selected subsets of the itemsets appear in the transaction database is determined. The method then outputs an association rule when the ratio of the number of times a selected subset appears in the transaction database to the number of times the associated itemset appears in the transaction database exceeds a predetermined minimum confidence value and thereby satisfies a minimum confidence constraint.

In still another aspect of the present invention, a system is disclosed for determining association rules in a transaction database of itemsets distributed among a plurality of local databases. Each local database is associated with a respective processing system, and each processing system includes a large itemset generator for generating candidate large itemsets in accordance with a predetermined concatenation regime. Each processor also includes a counter for counting the number of times selected of the candidate large itemsets appear in the local database to establish a local count. An exchanger is provided for exchanging data representative of the local count or local database between the processing system and the other processing systems. In accordance with principles discussed in detail below, the system includes at least one rule generator for generating association rules based on the local counts.

The details of the present invention, both as to its structure and operation, can best be understood in reference to the accompanying drawings, in which like reference numerals refer to like parts, and in which:

BRIEF DESCRIPTION OF THE PREFERRED EMBODIMENTS

DETAILED DESCRIPTION OF THE PREFERRED EMBODIMENTS

Figures 1, 2:
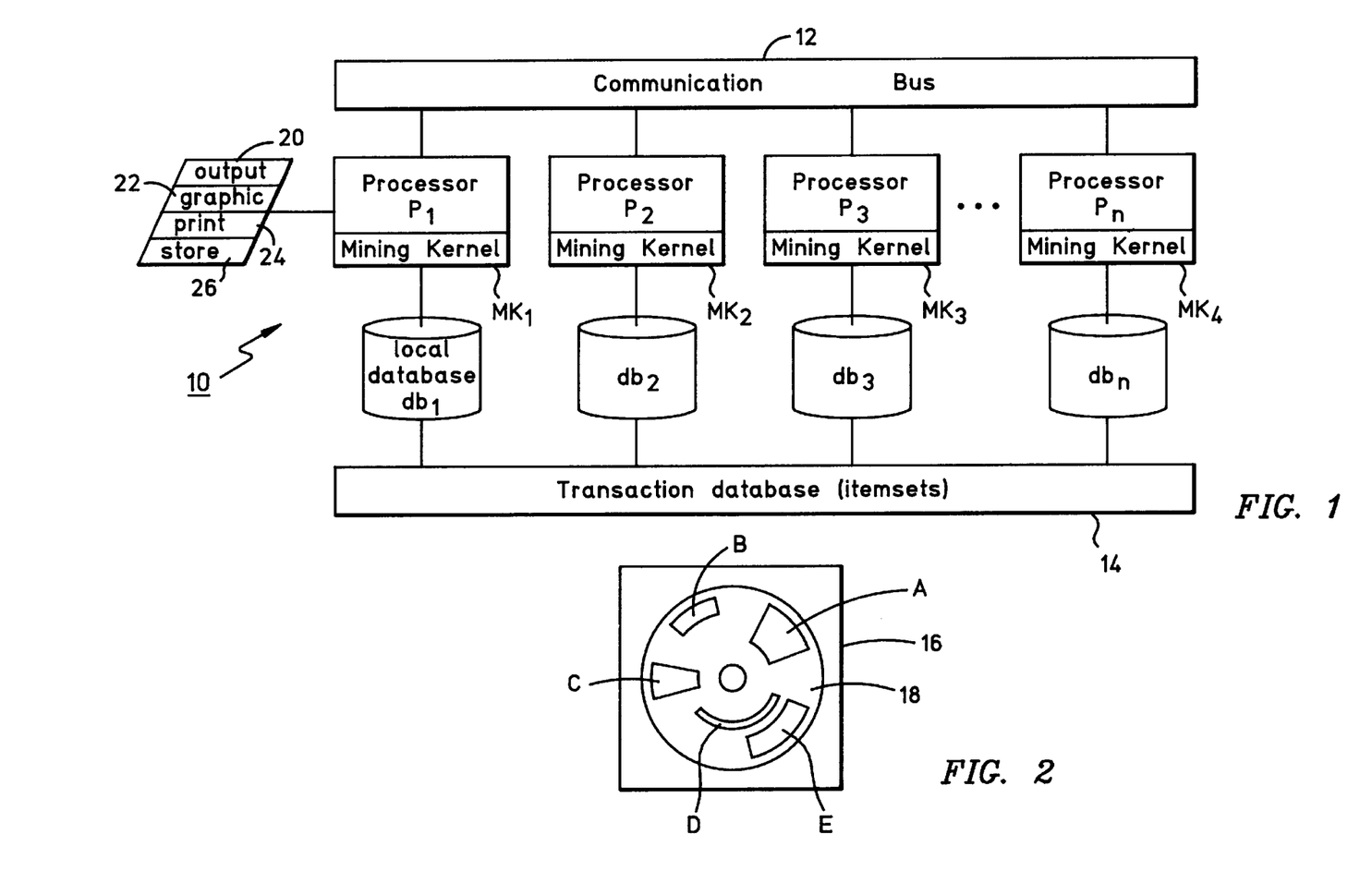
FIG. 1 is a schematic block diagram of the system for parallel mining of association rules of the present invention.
FIG. 2 illustrates a machine component embodying the present invention for illustration.

Referring initially to FIG. 1, a multiprocessor for mining databases for association rules is shown, generally designated 10. In the particular architecture shown, the multiprocessor 10 includes at least two, and preferably "n", digital processors $P_1$–$P_n$ (herein referred to individually as "$P_i$") which can transfer data to and from each other via a communication bus 12.

Each processor $P_i$ is associated with (i.e., accesses, manages, or controls) a respective local database $db_i$, as shown. In turn, the local databases $db_i$ access a transaction database 14 of transaction itemsets.

Also, each processor $P_i$ includes a respective mining kernel $MK_i$ (hereinafter occasionally generically referred to as "the mining kernel MK"), the operation of which is disclosed below. In accordance with the present invention, each mining kernel $MK_i$ of the present invention is implemented by a processing device within the associated processor $P_i$ that executes a series of computer-executable instructions to discover, in parallel with the other processors, association rules in itemsets in customer transactions that are stored in the transaction database 14.

FIGS. 3–16 illustrate the structure of the mining kernel MK of the present invention as embodied in a machine component that may comprise, for example, computer program software or an application-specific integrated circuit ("ASIC"). Those skilled in the art will appreciate that the Figures illustrate the structures of executable elements that function according to this invention. The invention is practiced in its preferred embodiment by a machine component comprising computer program code elements in a form that causes a digital processing apparatus (that is, a computer) to perform a sequence of function steps corresponding to those shown in the Figures.

These instructions may reside on a program storage device including a data storage medium, such as a computer diskette 16 shown in FIG. 2. The machine component is shown in FIG. 2 as a combination of program code elements A–E in computer readable form that are embodied in a computer-usable data medium 18, on the computer diskette 16. Alternatively, such media can also be found in semiconductor devices, on magnetic tape, on optical disks, on a DASD array, on magnetic tape, on a conventional hard disk drive, on electronic read-only memory or on electronic ransom access memory, or other appropriate data storage device. In an illustrative embodiment of the invention, the computer-executable instructions may be lines of compiled C++ language code.

Preferably, the multiprocessor 10 is a type 32 node IBM POWERparallel System SP2 Model 302, made by IBM Corp. of Armonk, N.Y., which uses an operating system sold under the trademark AIX level 3.2.5. In such a system, each processor $P_i$ is a Power2 processor operating at a processing frequency 66.7 MHz with 256 megabytes of real memory, and each local database $db_i$ is a two gigabyte disk. The communication bus 12 includes a High Performance Switch with HPS-2 adapters, all made by IBM.

Alternatively, the multiprocessor 10 can be a type "Gamma" system as disclosed in DeWitt et al., "The Gamma Database Machine Project", *IEEE Transactions on Knowledge and Data Engineering*, March, 1990. Or, the multiprocessor 10 can be a system made by Teradata and described in *DBC/1012 Data Base Computer System Manual*, C10-0001-02 release 2.0, November, 1985, or other suitable multiprocessor.

In any event, at least the processor $P_1$ outputs the association rules generated by the mining kernels MK via an output device 20. As shown, the output device 20 can include a graphics output element 22, such as a computer monitor, as well as a print element 24. Also, the mining results can be stored in long-term electronic storage 26.

Figure 3:
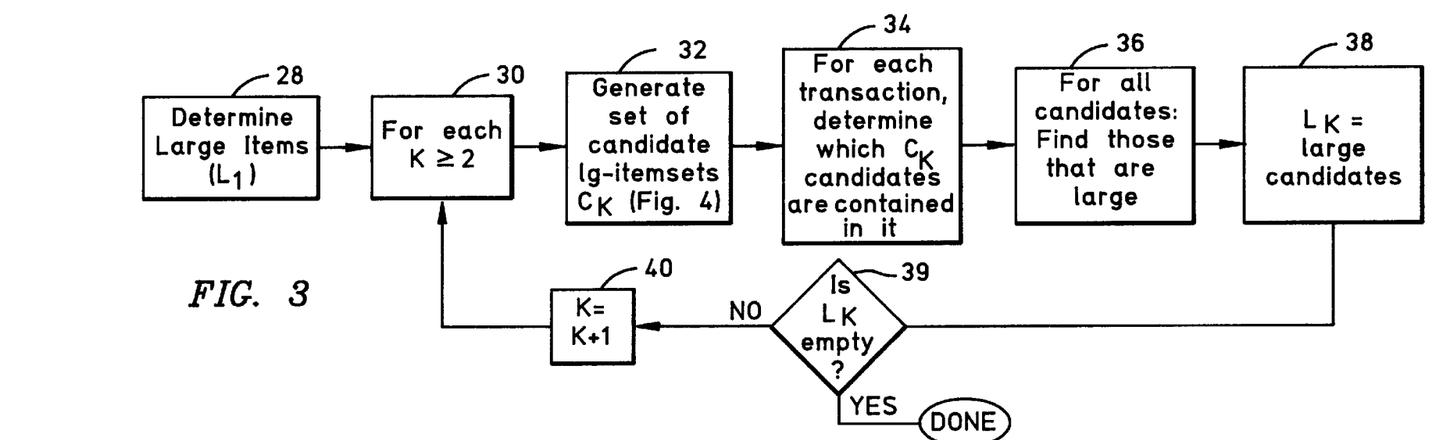
FIG. 3 is a flow chart showing the operation of the Apriori embodiment of the present invention in identifying large itemsets.
Figures 4, 5:
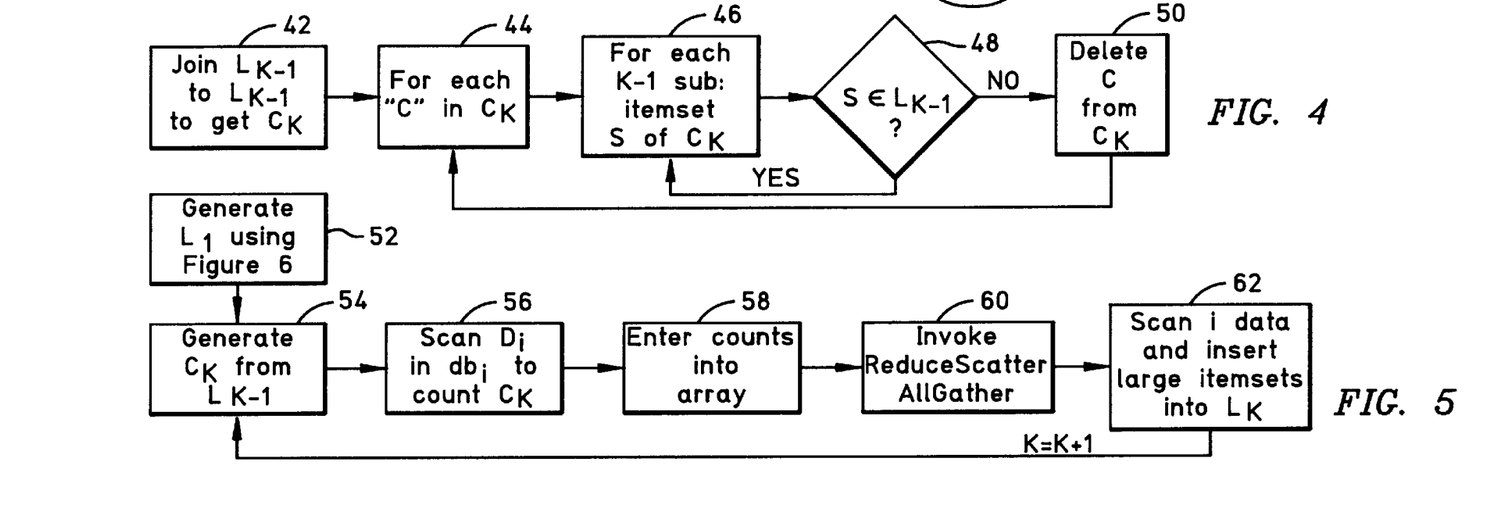
FIG. 4 is a flow chart showing the candidate generation of the present invention.
FIG. 5 is a flow chart showing the count distribution embodiment.

The above-referenced patent applications, from which this application claims priority, describe several useful single-processor methods that can be modified as disclosed herein for use by the multiprocessor mining kernel MK for discovering association rules among itemsets. FIGS. 3 and 4 show one such method, termed "Apriori", which is disclosed herein as an example of a useful single-processor method that can be used by the multiprocessor 10 under the principles of the present invention, although it is to be understood that other methods may also be used. In other words, it is the intent of the present invention to provide a system and method for discovering association rules among itemsets using a multiprocessor, thereby increasing the speed with which a very large database can be mined for useful rules.

To better understand the operation of the mining kernel MK of the present multiprocessor invention, reference is first made to FIGS. 3 and 4, which show the general operation of the "Apriori" method for discovering association rules. It is to be understood that the disclosure of the buffer management and data structures used by "Apriori" as set forth in the above-referenced patent applications are incorporated herein by reference.

As intended by the present invention, large itemsets in the transaction database 14 are first identified. By "large itemset" is meant a set of one or more items which are purchased in a user-defined percentage of all transactions in the transaction database 14, i.e., itemsets which are appear in the database 14 in a user-defined "minimum support" percentage of transactions. After the large itemsets have been identified, association rules are discovered between large itemsets. An association rule is representative of purchasing tendencies of consumers when the rule satisfies a predetermined minimum confidence value.

As an example, the present invention might access a database which chronicles transactions in an automobile parts, supplies, and service center. An association rule that can be discovered by the present invention might be that 98% of all customers who purchase tires along with tire pressure gages also purchase wheel balancing services during the transaction. Stated differently, in the example given it can be said with a 98% confidence level that wheel balancing services are purchased with tires and tire pressure gages. As recognized by the present invention, the implications of association rules which are discovered between itemsets can produce substantial economic value to retailers, advertisers, marketing executives, and indeed in a wide variety of applications.

Starting at block 28 in FIG. 3, the set $L_1$, of large single-item itemsets is identified in the transaction database 14. To determine whether a single item itemset is large, all items in the transaction database 14 are initially counted by passing over the transaction database 14, and their support determined as described above. The following publications, all of which are incorporated herein by reference, disclose specific methods for finding large itemsets: Agrawal et al., "Mining Association Rules Between Sets of Items in Large Databases", *Proc. of the ACM SigMod Conference on Management of Data*, Washington, D.C. 1993; Agrawal et al., "Fast Algorithms for Mining Association Rules in Large Databases", *Proc. of the VLDB Conference*, Santiago, Chile 1994; Houtsma et al., "Set-Oriented Mining of Association Rules", *IBM Research Report RJ* 9567, October, 1993; and Mannila et al., "Efficient Algorithms for Discovering Association Rules", *KDD-94:AAAI Workshop on Knowledge Discovery in Databases*, July 1994.

Next, at block 30, the "Apriori" method enters an iterative process for each $k \geq 2$. At block 32, as disclosed in greater detail below in reference to FIG. 4, a seed set of large itemsets $L_{k-1}$, having a length (i.e., number of itemsets) equal to "k-1" (initially consisting of the set of large itemsets disclosed above, wherein k=2) is used for generating a set of candidate large itemsets $C_k$ having length k.

Then, at block 34 as more fully disclosed below in reference to the multiprocessor Count Distribution method shown in FIG. 5, or the multiprocessor Data Distribution method shown in FIG. 11, or the multiprocessor Candidate Distribution method shown in FIGS. 12 and 13, the present invention determines which candidate large itemsets in the set $C_k$ of candidate large itemsets are contained in the transaction. At block 36, the support for the candidate large itemsets is determined by passing over the local databases $db_i$ to count the number of times each candidate large itemset is present, and then determining whether the number of times equals the minimum support value defined by the user.

At block 38, a forward set $L_k$ of actual large itemsets is set equal to the set of candidate large itemsets found at block 36 to have minimum support. This forward set $L_k$ of actual large itemsets becomes the seed for the next iteration at block 40. From block 40, the process returns to block 30. When $L_k$ is empty, the process terminates. This decision is shown in block 39.

FIG. 4 shows the details of the general Apriori embodiment in creating sets of candidate large itemsets. At block 42, $L_{k-1}$ is concatenated (i.e., joined) to itself to create an initial $C_k$ having c itemsets. More particularly, the itemsets, designated as $p.litemset_1$, $p.litemset_2$ ... $p.litemset_{k-1}$ of $L_{k-1}$, are joined to each of the other itemsets, designated $q.litemset_1$, $q.litemset_2$ ... $q.litemset_{k-1}$ in $L_{k-1}$ to yield a set $C_k$ of candidate large itemsets c, each c having k itemsets, with the constraint that no itemset c in $C_k$ is repeated.

Next, candidate itemsets c in the set $C_k$ of candidate large itemsets are pruned from $C_k$ if the candidate itemset "c" under test contains any subitemsets not found in $L_{k-1}$. More particularly, the "Apriori" method considers, at block 44, each customer itemset c in the set of candidate large itemsets $C_k$ as described below, and then proceeds to block 46 for each subitemset s having k-1 itemsets of the candidate set of large itemsets $C_k$.

Starting with the initial candidate itemset c in the set of candidate large itemsets $C_k$, and with the initial subitemset s of $C_k$ having k-1 itemsets at decision block 48, the "Apriori" method determines whether s is an element of the immediately preceding set of actual large itemsets $L_{k-1}$. As intended by the present invention, the set of large itemsets is used as the seed for the first iteration.

If s is an element of the immediately preceding set of actual large itemsets $L_{k-1}$, the method moves back to block 46 to retrieve the next subitemset s in $C_k$. Otherwise, the method proceeds to block 50 to delete, i.e., prune, c from $C_k$, and then returns to block 44 to test the next itemset c in $C_k$. As intended by the present invention, the immediately preceding set $C_{k-1}$ of candidate large itemsets may be used in lieu of the immediately preceding set of actual large itemsets $L_{k-1}$ to generate the set $C_k$ of candidate large itemsets.

With the above disclosure of one general example of a large itemset generator in mind, reference is now made to FIGS. 5–10 in understanding the preferred one of three multiprocessor embodiments of the mining kernel MK, termed herein "Count Distribution". Essentially, the mining kernel $MK_i$ of each processor $P_i$ generates, in parallel but not necessarily in lock-step with the mining kernels MK of the other processors P, a complete set $C_k$ candidate large itemsets for each pass wherein k>1. Then, each mining kernel $MK_i$ as embodied in the processors $P_i$ counts $C_k$ using only its local database $db_i$.

Thus, while the mining kernels $MK_i$ undertake the processes disclosed herein in parallel they do not necessarily undertake individual operations in lock-step with each other. Accordingly, it is to be understood that the disclosure below focusses on the operation of a single mining kernel MK for economy of disclosure, and that the mining kernels of all the processors P functions identically.

As disclosed below, at the end of each pass "k" the processors P exchange local counts to determine, in parallel and using the same protocol, and, hence, arriving at the same answer, the global count for $C_k$ (i.e., the support for each candidate in $C_k$ in the transaction database 14). The set $L_k$ of actual large itemsets is then generated by the mining kernel MK of each processor P using principles discussed above.

Specifically, starting at block 52, the set $L_1$, of large items is generated by each mining kernel $MK_i$ as disclosed below in reference to FIG. 6. Then, at block 54 the mining kernel $MK_i$ of each processor $P_i$ generates a set $C_k$ of candidate large itemsets from the previous set $L_{k-1}$ of actual large itemsets, using the principles discussed above. Thus, block 54 establishes a large itemset generator.

Next, at block 56 the mining kernel $MK_i$ of each processor $P_i$ scans the data $D_i$ in its associated local database $db_i$ to count the set $C_k$ of candidate large itemsets, using the principles discussed above. Accordingly, block 56 establishes a counter. Moving to block 58, the counts are entered into a local array.

Figures 6, 7, 8:
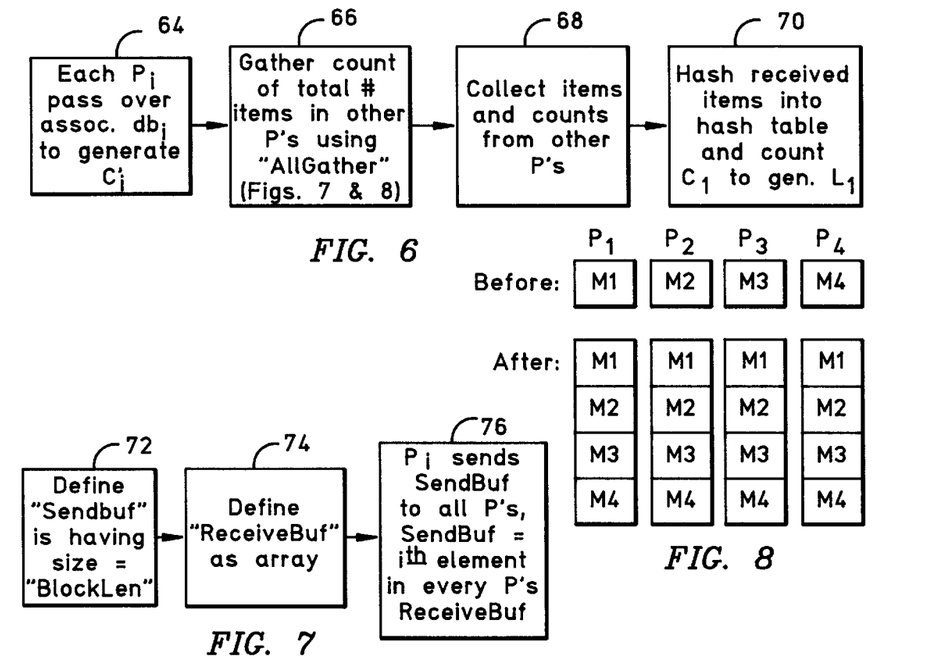
FIG. 6 is a flow chart showing the generation of the set of large items (k=1)
FIG. 7 is a flow chart showing the "AllGather" communication primitive.
FIG. 8 is a schematic diagram showing the operation of "AllGather"

As discussed in reference to FIG. 6, the set $C_k$ of candidate large itemsets is identical for each processor P. Moreover, each mining kernel $MK_i$ traverses the set $C_k$ of candidate large itemsets in exactly the same order. Accordingly, the corresponding elements of the local arrays will correspond to identical candidates "c" in the set $C_k$ of candidate large itemsets. Consequently, the only tuples that need be stored in the local arrays are the actual counts of candidate large itemsets.

From block 58, each mining kernel MK moves to block 60 to invoke the "ReduceScatter" and "AllGather" routines described in reference to FIGS. 7–10 to receive the counts of the set $C_k$ of candidate large itemsets which are contained in the local arrays of the processors P ("the remote processors") that are remote from the processor $P_i$ with which the particular mining kernel $MK_i$ is associated. Thus, block 60 establishes an exchanger for exchanging data between the processors $P_n$.

Then, the data collected is scanned by each mining kernel MK of each processor P at block 62 to determine the set $L_k$ of actual large itemsets, under the principles discussed above. The integer value "k" representing the pass number is incremented by one, and each mining kernel MK returns to block 54. It will be understood after the disclosure of the "ReduceScatter" routine described below in reference to FIG. 9 that each processor $P_i$ receives only a portion of the local counts from the remote processors, counts them, and then exchanges the partial counts to thereby reduce processing time.

FIG. 6 shows the method by which the set $L_1$, of large items is generated in the "Count Distribution" embodiment. It is to be understood that initially, the data contained in the transaction database 14 is distributed by means well-known in the art substantially pro rata among the local databases $db_i$.

At block 64, each mining kernel MK as embodied in an associated one of the processors $P_i$ passes over its database $db_i$ to generate $C_1^i$ in accordance with principles discussed above. Candidate large items and their associated counts are maintained in a closed hash table, such as, e.g., the structure disclosed in Aho et al., *Data Structures and Algorithms*, Addison-Wesley. 1983, incorporated herein by reference, and these data are loaded into a send buffer associated with the processor $P_i$ as a count buffer.

Moving to block 66, each mining kernel $MK_i$ invokes the "AllGather" routine to gather the total number of items residing in the send buffers of the remote processors P, as generated by the mining kernels MK of those remote processors. During this operation, each mining kernel $MK_i$, also transmits the number of items in its send buffer to the remote processors. After this operation, local count arrays are identical in dimension, i.e., the $j^{th}$ element of each local count array now contains the number of items contained in the send buffer of the $j^{th}$ processor.

Next, at block 68 each mining kernel $MK_i$ embodied in an associated processor $P_i$ receives the actual items and associated counts from the remote processors and hashes them into the local hash table. When the same item is counted by more than one processor, the support count for the item is accumulated in a bucket dedicated to that item in the hash table. Thus, after the operation of block 68 the local hash tables of the processors P are identical to each other. Accordingly, at block 70 the mining kernels MK count the items in their associated local hash tables to generate, in parallel with each other, identical sets $L_1$, of large items.

FIGS. 7 and 8 show the operation of the "AllGather" routine. Starting at block 72 in FIG. 7, a particular mining kernel MK, in invoking the "AllGather" routine, defines a variable "SendBuf" to be an integer having a size equal to the number of items in the count buffer. Also, at block 74 a variable "ReceiveBuf" is defined to be an array of "n" messages. Then, at block 76, the invoking processor $P_i$ transmits its associated send buffer (i.e., "$SendBuf_i$") to the remote processors, with its "$SendBuf_i$" constituting the $i^{th}$ element in the receive arrays of the remote processors.

FIG. 8 illustrates the operation of the "AllGather" routine for n=4. As shown, prior to invoking the routine each processor $P_i$ has stored its own set $M_i$ of data to be transmitted. After the routine has been invoked, each processor $P_i$ has stored an array of four sets of data, in order by processor P i.d. Consequently, the four sets of data are identical to each other.

Figure 9:
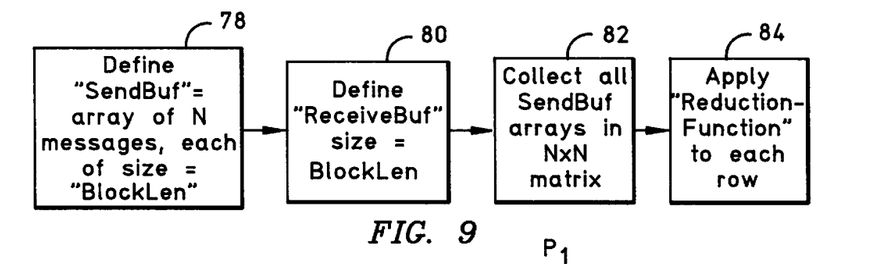
FIG. 9 is a flow chart showing the "ReduceScatter" communication primitive.
Figure 10:
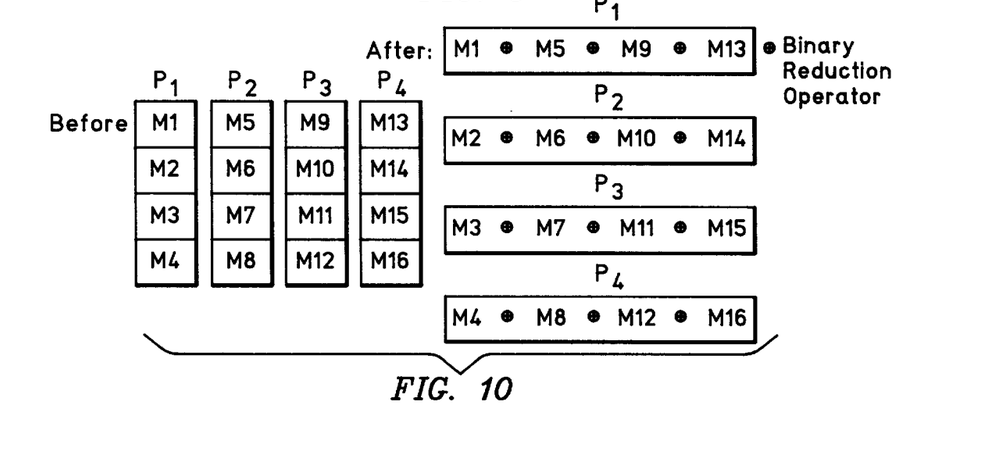
FIG. 10 is a schematic diagram showing the operation of "ReduceScatter"

FIG. 9 shows the operation of the "ReduceScatter" routine. At block 78, a particular mining kernel MK, in invoking the "ReduceScatter" routine, defines a variable "SendBuf" to be the local count array having size "BlockLen", wherein "BlockLen" is equal to the size of the local count array divided by the number of processors "n" in the multiprocessor 10. Also, at block 80 a variable "ReceiveBuf" is defined to be an array referred to as "PartGCnt" for holding n messages, i.e., for holding the local count arrays received from the remote processors P.

At block 82 each mining kernel MK collects the local count arrays (i.e., the "SendBuf" arrays of its own processor and those received from the remote processors) in a matrix having dimension n×n, wherein n=number of processors P in the multiprocessor 10. Next, at block 84 in FIG. 9, and as shown graphically in FIG. 10, a reduction function is applied to each row in the array, such that each processor $P_i$ exits the "ReduceScatter" routine with i, i+n, i+2n, ... count arrays.

It may now be appreciated that at block 60 in FIG. 5, each processor $P_i$ receives only a portion of the local counts, and then establishes a partial count at block 62 prior to exchanging its partial count with the remote processors, thereby reducing processing time. More particularly, each processor $P_i$ counts the $i^{th}$, $n+i^{th}$, $2n+i^{th}$, ... local count, and then the added counts are exchanged using "AllGather".

Figure 11:
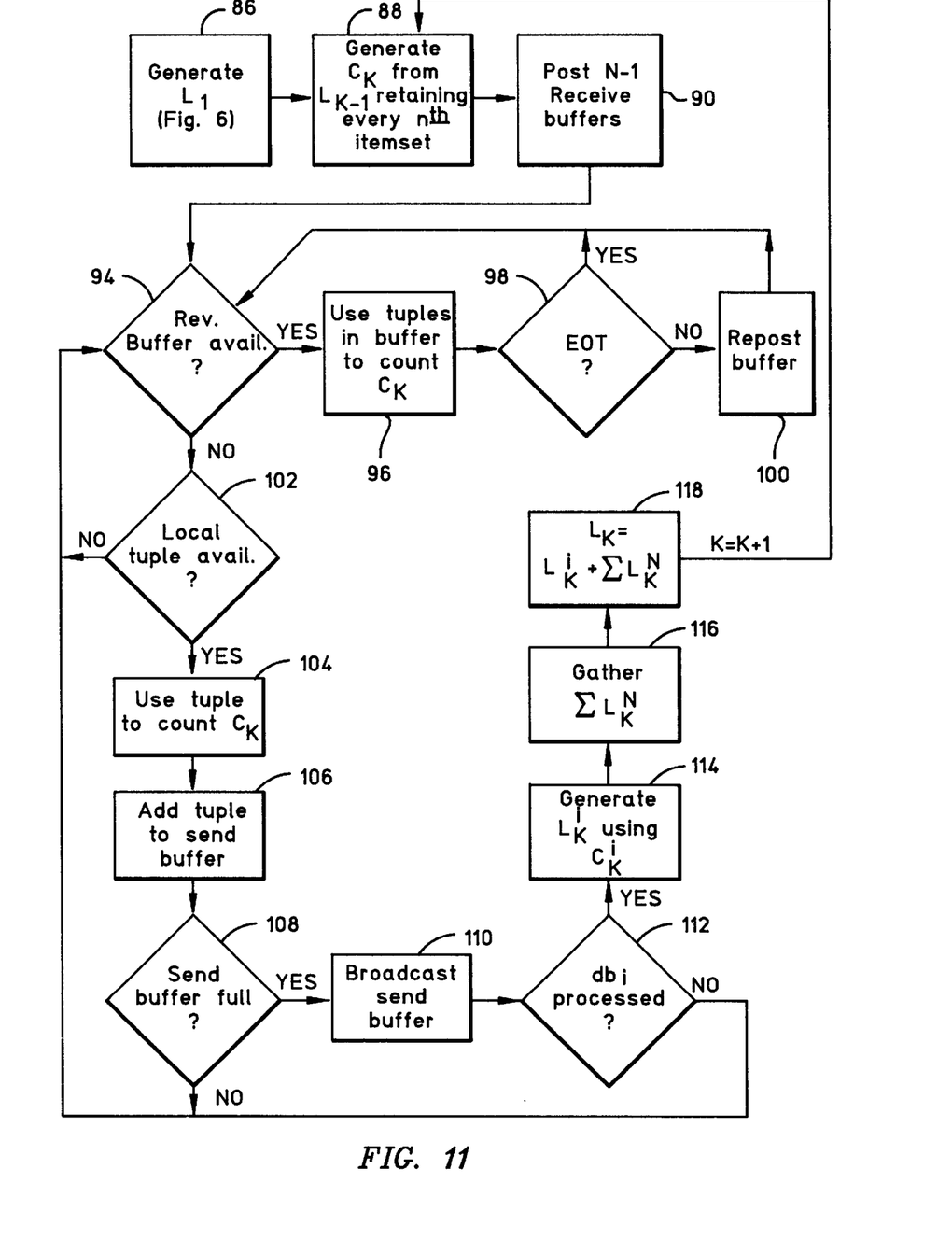
FIG. 11 is a flow chart showing the data distribution embodiment.

FIG. 11 shows the Data Distribution embodiment of the present invention in generating association rules using parallel processing. Beginning at block 86, the set $L_1$ of large items is generated by each mining kernel MK as described in reference to FIG. 6. Next, the set $C_k$ of candidate large itemsets is generated at block 88, using principles disclosed above, with the exception that the $n^{th}$ mining kernel MK retains only every $n^{th}$ candidate large itemset generated, with the identity of the particular candidate itemsets to be retained being determined by the processor i.d. of the particular processor P. Thus, each mining kernel $MK_i$ generates a local set $C_k^i$ of candidate large itemsets that is unique from the remote sets of candidate large itemsets.

At block 90, the mining kernel MK embodied by each processor P posts n−1 receive buffers for asynchronously receiving a page of data from the respective local databases db of the n−1 remote processors. The mining kernel MK then proceeds to decision block 94, wherein it is determined whether a page of data in any receive buffer is available. If it is, the mining kernel MK embodied by its associated processor P proceeds to block 96 to use the entire page of received tuples to count its local set $C_k^i$ of candidate large itemsets.

Proceeding to decision block 98, the mining kernel MK embodied by the particular processor P determines whether the remote processor that has sent the page of data at block 94 has indicated that no further data will be sent (i.e., whether end-of-transmission for the particular remote processor has been sent). If so, the mining kernel MK loops back to decision block 94. Otherwise, the mining kernel MK proceeds to block 100 to repost the receive buffer allocated to the remote processor whose data has just been considered, and then loops back to decision block 94.

If the test at decision block 94 is negative (i.e., no receive buffers are full of data), the mining kernel $MK_i$ associated with the particular processor $P_i$ proceeds to decision block 102 to determine whether a tuple is available in the local database $db_i$. If not, the mining kernel $MK_i$ loops back to decision block 94, but if so, the mining kernel proceeds to block 104 to use the tuple to count the local set $C_k^i$ of candidate large itemsets.

From block 104, the mining kernel $MK_i$ proceeds to block 106 to release the tuple to its send buffer, and then to decision block 108 to determine whether the send buffer is full. If it isn't, the mining kernel $MK_i$ loops back to decision block 94.

In contrast, if, at decision block 108, the mining kernel $MK_i$ determines that the send buffer is full, then the mining kernel $MK_i$, proceeds to block 110 to serially broadcast the send buffer to the remote processors. Next, at decision block 112, the mining kernel $MK_i$ determines whether its entire local database $db_i$ has been processed, and if not, loops back to decision block 94.

On the other hand, if the entire local database $db_i$ has been processed, the mining kernel $MK_i$ proceeds to block 114 to generate a local set $L_k^i$ of large itemsets, in accordance with principles disclosed above, using the local set $C_k^i$ of candidate large itemsets. Next, the mining kernel $MK_i$, at block 116, gathers the local sets $L_k^n$ of large itemsets from the remote processors and transmits its local set $L_k^i$ of large itemsets to the remote processors. At block 118, the mining kernel $MK_i$ establishes the global set $L_k$ of large itemsets to be the sum of the local sets of large itemsets, and then increments the pass number and loops back to block 88 to commence the next iteration. Thus, when all mining kernels MK have completed block 118 for a particular iteration, all processors P have the same global set $L_k$ of large itemsets locally available for the k+1 iteration.

FIGS. 12-15 show the Candidate Distribution embodiment of the present invention. It is to be understood that the present invention contemplates using the Data Distribution or Count Distribution embodiments described above for passes over the distributed database up to pass k=1. At pass k=1, the Candidate Distribution embodiment may be invoked by a mining kernel $MK_i$ by commencing at block 120 in FIG. 12. At block 120, a global set G of large itemsets having lengths $L_{k-1}$ and $L_{k-2}$ is generated and then partitioned among the n processors $P_n$ as described more fully below in reference to FIG. 14, such that each processor $P_i$ has distributed to it a partition $G_i$ that is disjoint from the other partitions of the global set G. Each processor $P_i$, however, records which remote processors P are assigned which large itemsets that have not been assigned to the processor $P_i$.

Next, at block 122, the mining kernel $MK_i$ generates a local set $C_k^i$ from its partition $G_i$ of large itemsets, using principles previously disclosed. Next, at block 124, the mining kernel $MK_i$ creates n-1 send buffers, one for each remote processor, and posts n-1 receive buffers, again one for each remote processor. As intended by the present invention, the send and receive buffers are the means by which the processors $P_n$ exchange data with each other from their local databases $db_n$.

Figure 12:
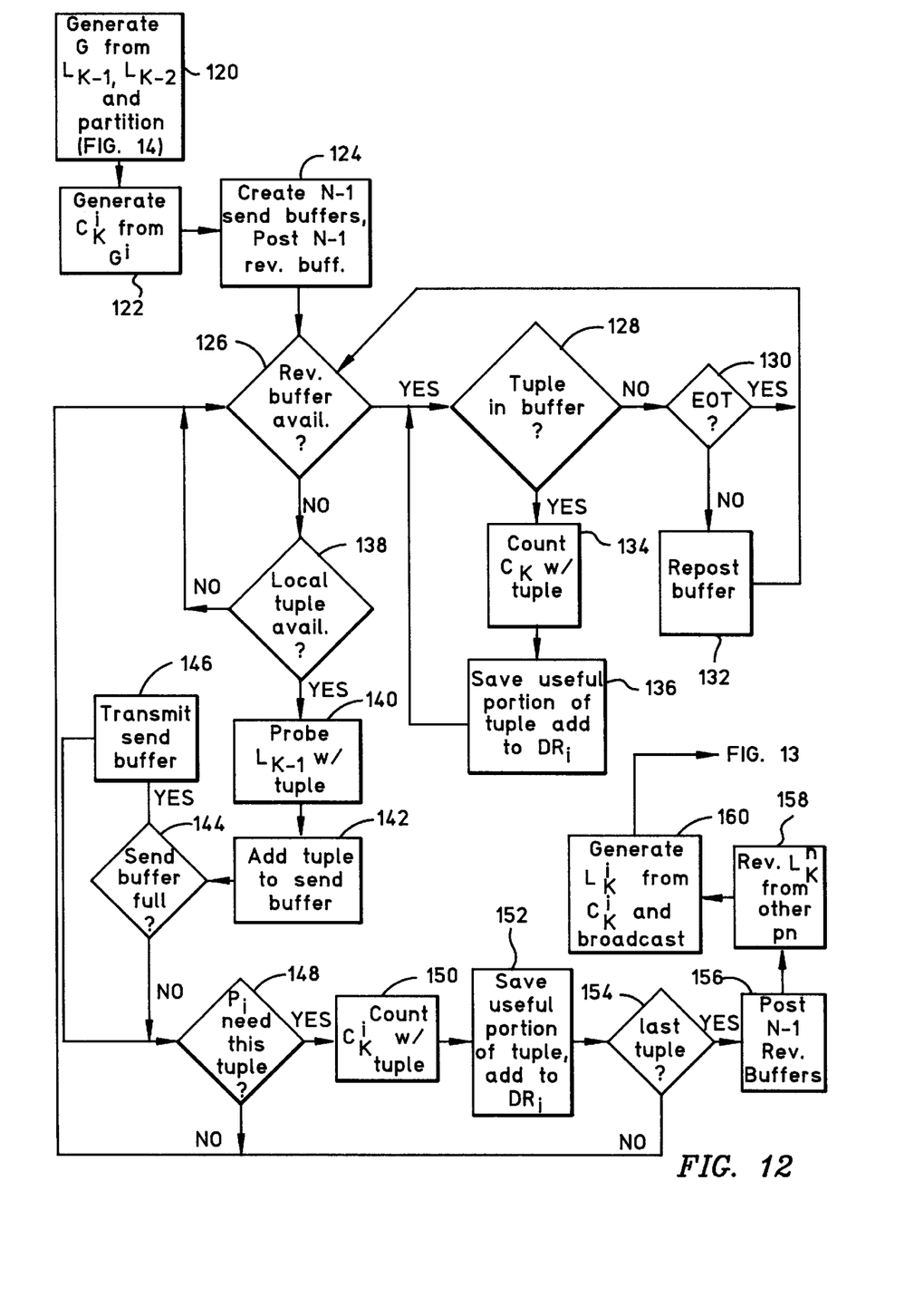
FIG. 12 is a flow chart showing the first iteration (k=1) of the candidate distribution embodiment.

Continuing with the description of the flow chart shown in FIG. 12, the mining kernel $MK_i$ proceeds to decision block 126 to determine whether a page of data in any receive buffer is available. If it is, the mining kernel MK embodied by its associated processor P proceeds to decision block 128 to determine whether a tuple is present in the receive buffer. If not, in block 130 the mining kernel MK determines whether the remote processor that has sent the page of data at block 126 has indicated that no further data will be sent (i.e., whether end-of-transmission for the particular remote processor has been sent). If so, the mining kernel MK loops back to decision block 126. Otherwise, the mining kernel MK proceeds to block 132 to repost the receive buffer allocated to the remote processor whose data has just been considered, and then loops back to decision block 126.

If a tuple has been found in the receive buffer at decision block 128, the mining kernel MK counts its local set $C_k^i$ of candidate large itemsets using the tuple at block 134. From block 134, the mining kernel MK proceeds to block 136 to save the useful portion of the tuple in a local useful database $DR_i$, and then loops back to decision block 128.

By "useful" portion of a tuple is meant that portion of the tuple which contributed to the count of any candidate large itemset in the local set $C_k^i$ of candidate large itemsets. All other portions of the tuple are pruned at block 136.

If the test at decision block 126 is negative (i.e., no receive buffers are full of data), the mining kernel $MK_i$ proceeds to decision block 138, wherein the mining kernel $MK_i$ associated with the particular processor $P_i$ determines whether a tuple is available in the local database $db_i$. If not, the mining kernel $MK_i$ loops back to decision block 126, but if so, the mining kernel proceeds to block 140 to probe the preceding set $L_{k-1}$ of actual large itemsets with the tuple.

Recall that the mining kernel $MK_i$ accessed, at block 120, the preceding global set $L_{k-1}$ of actual large itemsets, and retained a record of which remote processors were assigned which large itemsets from the preceding global set $L_{k-1}$ of actual large itemsets. Accordingly, by "probe" is meant that the mining kernel $MK_i$ determines whether the local tuple under test may be of use to any other processor $P_n$ in counting its local set $C_k^n$ of candidate large itemsets under the principles discussed above in relation to FIGS. 3 and 4.

From block 140, the mining kernel $MK_i$ proceeds to block 142 to add any useful portion of the tuple under test to the send buffer of the remote processor(s) P that require the tuple. At block 144, it is determined whether any send buffer is full, and if so, the send buffer is asynchronously transmitted at block 146 to the corresponding remote processor.

From block 146, or, if the test there was negative, from decision block 144, the mining kernel $MK_i$ proceeds to decision block 148 to determine whether the particular processor $P_i$ associated with the mining kernel $MK_i$ requires the tuple to count any candidate in the local set $C_k^i$ of candidate large itemsets. If not, the mining kernel $MK_i$ loops back to decision block 126, but if so, the mining kernel $MK_i$ counts its local set $C_k^i$ of candidate large itemsets using the tuple at block 150 in accordance with the principles discussed above in relation to FIGS. 3 and 4.

From block 150 the mining kernel $MK_i$ proceeds to block 152 to save any useful portion of the tuple in the local useful database $DR_i$. Next, at decision block 154, the mining kernel $MK_i$ determines whether the last tuple has been considered, and if not, loops back to decision block 126.

In contrast, if, at decision block 154, the mining kernel $MK_i$ determines that the last tuple has been considered, the mining kernel $MK_i$ proceeds to block 156 to post n-1 receive buffers, and then proceeds to block 158 to receive local sets $L_k^n$ of actual large itemsets from the remote processors $P_n$. Also, at block 160 the mining kernel $MK_i$ generates its local set $L_k^i$ of actual large itemsets from its local set $C_k^i$ of candidate large itemsets in accordance with the principles discussed above in relation to FIGS. 3 and 4, and then asynchronously broadcasts its local set $L_k^i$ of actual large itemsets to the other processors $P_n$ before proceeding to FIG. 13.

Figure 13:
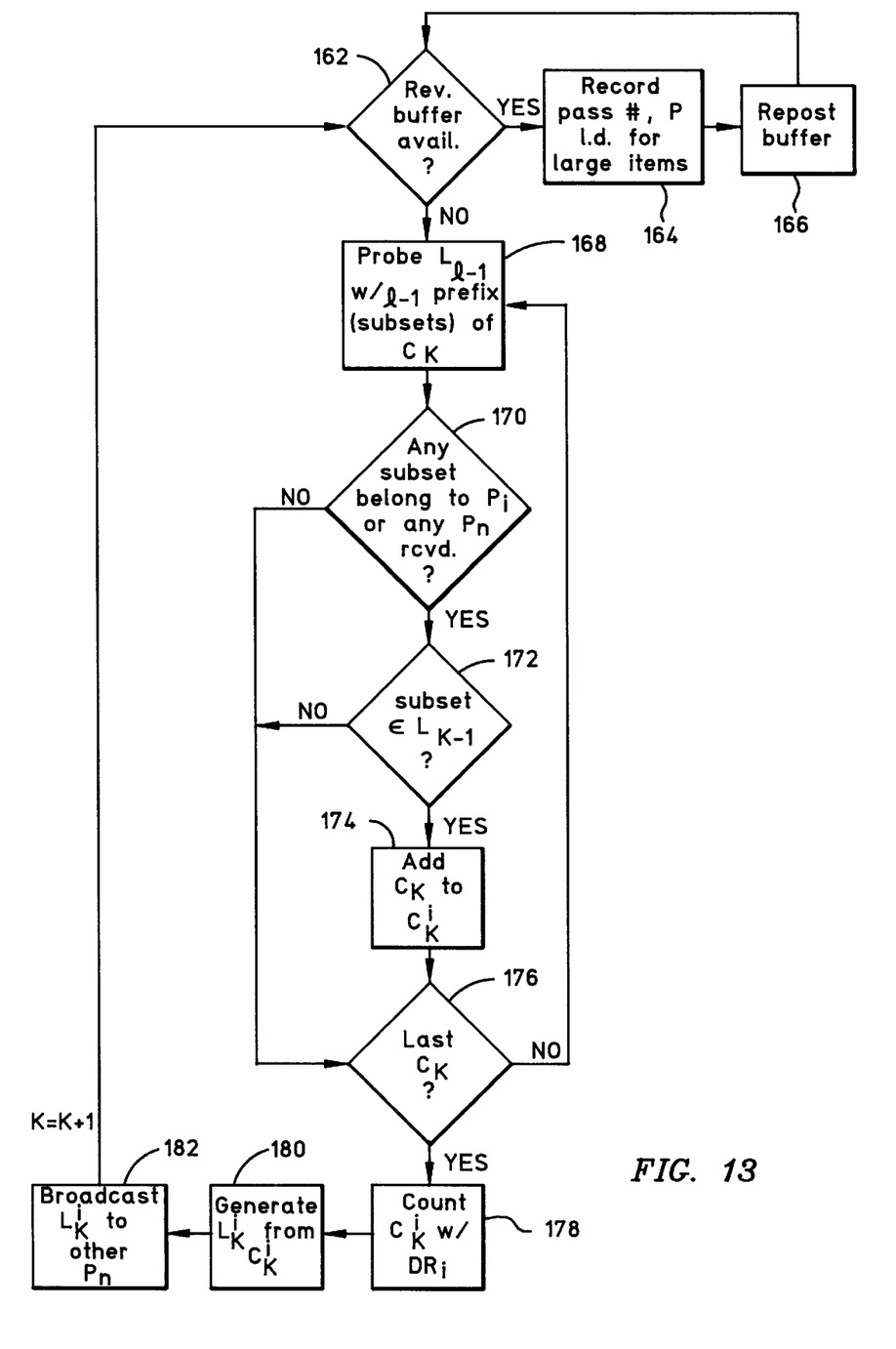
FIG. 13 is a flow chart showing the second and subsequent iterations (k>1) of the candidate distribution embodiment.

Now referring to FIG. 13, the operation of the candidate distribution embodiment of the present invention for passes k>1 can be seen. Starting at decision block 162, it is determined whether a receive buffer is available. If so, the mining kernel $MK_i$ proceeds to block 164 to record the pass number, remote processor i.d., and largest pass (i.e., k) value received from the particular remote processor for the large items contained in the receive buffer. From block 164, the receive buffer is reposted at block 166, and then the invention loops back to decision block 162.

If the test at decision block 162 is negative, the mining kernel $MK_i$ proceeds to block 168 to probe the set $L_{l-1}$ of actual large itemsets with l-1 long prefixes of each of the candidate large itemsets in the local set $C_k^i$ of candidate large itemsets. More particularly, at block 168 the mining kernel $MK_i$ accesses the information stored at block 164 to determine whether, for the particular candidate prefix under test, the remote processor $P_n$ responsible for it has transmitted its set $L_{k-1}{}^n$ of large itemsets to the local processor $P_i$. As the skilled artisan will recognize, this is to ensure that, during the asynchronous operation of the candidate distribution embodiment, no local candidate is pruned only on the basis of the existing local preceding set $L_{k-1}{}^i$ of large itemsets, when the candidate might yet be found to be an element of a remote set $L_{k-1}{}^n$ of large itemsets not yet received from one or more of the remote processors $P_n$.

From block 168, the mining kernel $MK_i$ proceeds to decision block 170 to determine whether the particular subset of a local candidate large itemset under test belongs to the local processor $P_i$ or to a remote processor $P_n$, either by virtue of being an element of the local immediately preceding set $L_{k-1}{}^i$ of large itemsets or by potentially being an element of a remote set $L_{k-1}{}^n$ of large itemsets not yet received from one or more of the remote processors $P_n$. If the test at decision block 170 is positive, the mining kernel $MK_i$ proceeds to decision block 172 to determine whether the subset under test is an element of the local set $L_{k-1}{}^i$ of large itemsets. If so, the mining kernel $MK_i$ moves to block 174 to add the associated candidate $c_k$ to the local set $C_k^i$ of candidate large itemsets.

From block 174, or from decision blocks 170 or 172 if the tests there were negative, the mining kernel $MK_i$ moves to decision block 176, wherein it is determined whether all candidates in the local set $C_k^i$ of candidate large itemsets have been tested. If not, the mining kernel $MK_i$ loops back to block 168. Otherwise, the mining kernel $MK_i$ proceeds to block 178.

At block 178, the mining kernel $MK_i$ counts the local set $C_k^i$ of candidate large itemsets using the local useful database $DR_i$. Then, at block 180, a local set $L_k^i$ of large itemsets is generated in accordance with principles discussed above, and this local set is then broadcast at block 182 to the remote processors $P_n$, prior to incrementing the local value for k by one and looping back to decision block 162.

Figure 14:
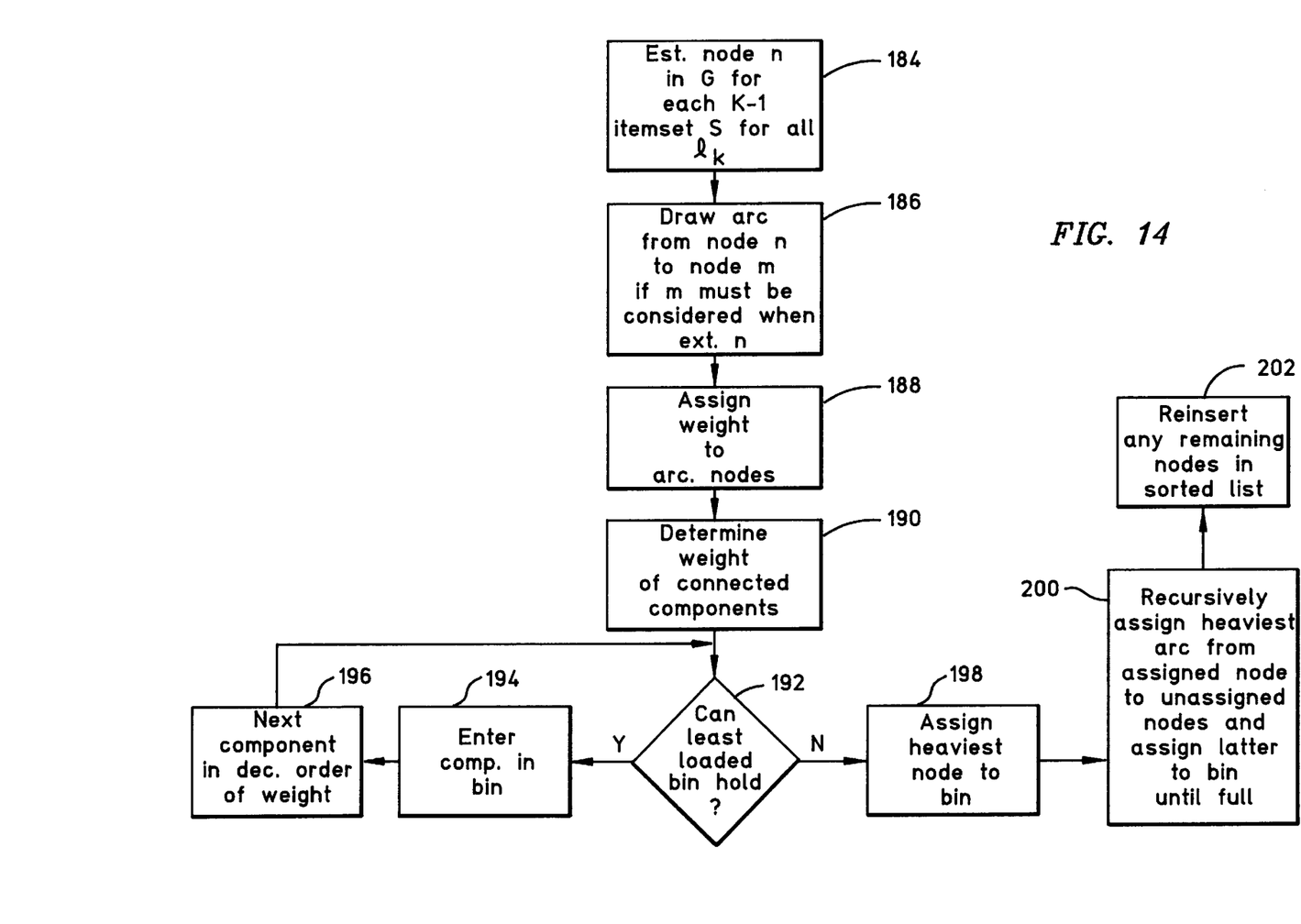
FIG. 14 is a flow chart showing the candidate partitioning operation of the candidate distribution embodiment.
Figure 15:
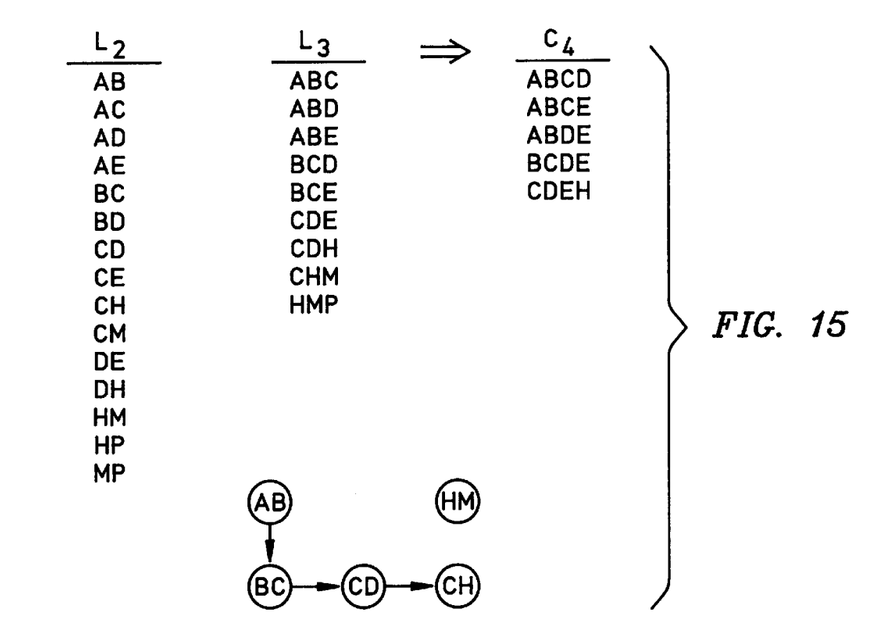
FIG. 15 illustrates an example of the candidate partitioning.

Now referring to FIGS. 14 and 15, the means by which the global set G of large itemsets is partitioned among the processors $P_n$ can be seen. As shown in the flow chart of FIG. 14 and as graphically shown in FIG. 15, the Candidate Distribution embodiment seeks to evenly distribute candidate large itemsets at iteration k=1 substantially equally among the processors $P_n$, such that each processor $P_i$ has allocated to it a local set $G_i$ of large itemsets from which it can generate a local set $C_k^i$ of candidate large itemsets.

Starting at block 184, a node is established in the global set G for each k-1 itemset s for all large itemsets $l_k$. Then, at block 186, an arc is drawn from a node "n" to a node "m" if the itemset corresponding to the node "m" must be considered when extending the itemset corresponding to the node "n".

For example, FIG. 15 shows that for l=3, the set $L_3$ of large itemsets includes subsets of length 2 (=k-1), with the set $C_4$ of candidate large itemsets derived from the set $L_3$ of large itemsets per the above disclosure also shown (assuming a minimum support=2). For illustration purposes, five nodes corresponding to elements of $L_2$ are depicted as circles in FIG. 15, and arcs have been drawn between certain of the nodes per the disclosure above regarding block 186.

Specifically, node BC must be used to extend node AB in arriving at the large itemset ABC, which itself can be used to generate one of the candidate large itemsets in $C_4$ (assuming minimum support=2). Likewise, node CD must be used to extend the node BC to arrive at the large itemset BCD, which itself can be used to generate one of the candidate large itemsets in $C_4$, and so on. However, the large itemset HMP cannot be used to generate a candidate large itemset of length 4. Accordingly, no arc is drawn between the node HM and other nodes.

After the arcs have been established at block 186, the mining kernel $MK_i$ proceeds to block 188 to determine the weight of the arcs and nodes. Each node "n" is assigned a weight=sum of the support $(l_k)$ of all $l_k$ extensions of the node. Further, an arc from a node "n" to a node "m" is assigned a weight=support(itemset(n) $\cap$ itemset (m))/weight (node (m)).

Next, at block 190 the weight of connected nodes/arcs, i.e., the weight of "components" is determined. For example, the total weight of the large component shown in FIG. 15, i.e., the weight of the nodes AB, BC, CD, CH and the weight of the arcs AB→BC, BC→CD, CD→CH would be summed at block 190.

Proceeding to decision block 192, respective bins for each processor are established with capacity=W/N, wherein W is the total weight of all nodes and arcs and N is the number of processors, and at block 192 it is determined whether the least filled bin can hold the heaviest component. If so, at block 194 the component is assigned to the processor corresponding to the bin, and then at block 196 the next heaviest component is considered for test at decision block 192.

On the other hand, if the least loaded bin cannot hold the heaviest node, the mining kernel $MK_i$ proceeds to block 198 to assign the heaviest node of the heaviest component to the least filled bin. Then, at block 200, the heaviest arc, next connected node, next arc, and so on are recursively assigned to the least filled bin until the bin is full. At block 202, any remaining nodes are reinserted into the list of nodes to be sorted between the processors $P_n$.

Figure 16:
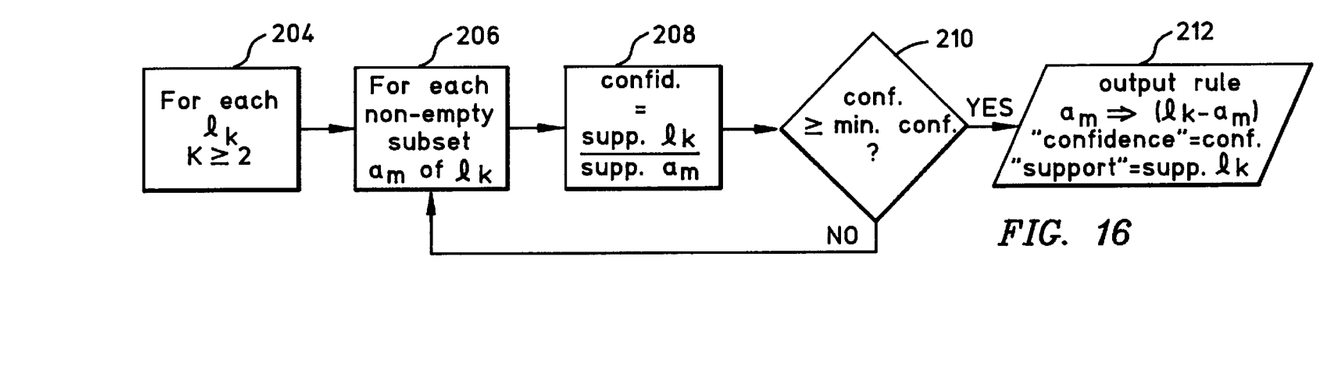
FIG. 16 is a flow chart of the association rule generator of the present invention.

Turning now to FIG. 16, one embodiment of the association rule discoverer of the present invention is shown. A single processor $P_i$ may undertake the operation shown in FIG. 16. Alternatively, after parallel identification of large itemsets as described above, the large itemsets may be distributed, and association rules generated by each processor for its large itemsets using the steps described below. Preferably, in distributing large itemsets, itemsets of equal length are distributed pro rata among the processors $P_n$.

FIG. 16 shows the preferred, relatively simple steps in generating association rules of the present invention. A relatively more complex method is disclosed in the above-referenced patent application for an invention entitled "SYSTEM AND METHOD FOR MINING GENERALIZED ASSOCIATION RULES IN A DATABASE", and that method can be substituted, if desired, for the method shown in FIG. 16.

Accordingly, FIG. 16 is entered by the mining kernel $MK_i$ after all large itemsets in the transaction database 14 have been identified using the Data Distribution, Count Distribution, or Candidate Distribution embodiments, each of which establishes a distributed large itemset generator. Stated differently, FIG. 16 is entered with all itemsets found by the distributed large itemset generator to have a support value in the transaction database 14 which exceeds the user-defined minimum support value.

As indicated at block 204, the mining kernel MK undertakes the operations shown in FIG. 16 for each large itemset $l_k$, $k \geq 2$, and proceeds to block 206, wherein the mining kernel MK selects the next non-empty subset $a_m$ of the large itemset $l_k$ under test. At block 208, for the subset $a_m$ under test, the mining kernel MK calculates a confidence value to be the support of the large itemset $l_k$ under test divided by the support of the subset $a_m$ under test. Then, at decision block 210, the mining kernel MK compares the confidence value of the subset $a_m$ to a user-defined minimum confidence value, and if the confidence value of the subset $a_m$ is not at least equal to the user-defined minimum confidence value, the mining kernel MK loops back to block 206 to retrieve the next subset $a_{m+1}$ of the large itemset $l_k$ under test.

On the other hand, if, at decision block 210, the mining kernel MK determines that the confidence value of the subset $a_m$ is at least equal to the user-defined minimum confidence value, the mining kernel MK proceeds to output block 212 to output an association rule of the form $$a_{m-1} \rightarrow (l_k - a_{m-1})$$

with "confidence=[calculated confidence value], "support= [support of $l_k$], and the term on the right side of the implication arrow is referred to as the "consequent" of the rule. From output block 212. the mining kernel MK loops back to block 206 to retrieve the next subset $a_{m+1}$ of the large itemset $l_k$ under test.

If desired, alternative association rule discoverers, e.g., the method shown in FIGS. 11 and 12 of the above-referenced patent application for "SYSTEM AND METHOD FOR MINING GENERALIZED ASSOCIATION RULES IN A DATABASE", incorporated herein by reference, can be used.

While the particular system and method for parallel mining of association rules in databases as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A digital multiprocessor comprising a plurality of processing systems, each processing system including a respective local database having distributed therein data from a transaction database of itemsets purchased in consumer transactions, each processing system including:

means for determining the number of times a candidate itemset appears in the associated local database to establish a local count for the candidate itemset;

means for using the local count to determine whether the number of times a candidate itemset appears in the transaction database exceeds a predefined minimum support value;

means for entering a candidate itemset into a set of large itemsets when the number of times exceeds a predetermined minimum support value, such that the set of large itemsets can be designated as frequently occurring itemsets in transactions;

means for determining, for at least some of the itemsets in the set of large itemsets the number of times selected subsets of the itemsets appear in the transaction database;

means for outputting an association rule when the ratio of the number of times a selected subset appears in the transaction database to the number of times the associated itemset appears in the transaction database exceeds a predetermined minimum confidence value and thereby satisfies a minimum confidence constraint; and means for exchanging the local count with the other processing systems such that each processing system determines whether the number of times a candidate itemset appears in the transaction database exceeds the predefined minimum support value.

2. The digital multiprocessor of claim 1, wherein each processing system includes means for generating a global set G of large itemsets and partitioning the global set G among the n processing systems such that a local set $G^i$ comprising approximately G/n large itemsets is distributed to each system, and each system establishes the local count using the local set $G^i$.

3. The digital multiprocessor of claim 1, wherein each processing system further comprises:

means for generating the candidate itemsets by concatenating itemsets in the set of large itemsets in accordance with a predetermined concatenation regime, each of the processing systems being associated with a respective set of 1/n candidate large itemsets;

means for receiving remote portions of the transaction database from the other processing systems; and means for establishing the local counts by alternatingly determining the number of times one or more of the 1/n candidate large itemsets appear in the respective local database and in the remote portions of the transaction database.

4. The digital multiprocessor of claim 3, wherein each processing system further comprises:

means for establishing n−1 receive buffers for receiving the remote portions of the transaction database; and means for establishing the local counts by determining the number of times one or more of the 1/n candidate large itemsets appear in the remote portions of the transaction database when a receive buffer is full and otherwise determining the number of times one or more of the 1/n candidate large itemsets appear in the respective local database.

5. The digital multiprocessor of claim 4, wherein each processing system further comprises:

means for entering a candidate itemset into a local set of large itemsets when the respective local count exceeds a predetermined minimum support value;

means for transmitting the local set of large itemsets to the other processing systems;

means for receiving from the other processing systems respective remote sets of large itemsets; and means for determining the sum of the local set and the remote sets to establish a global set of large itemsets.

6. A computer-implemented method for identifying frequently recurring itemsets in transactions which are stored in a transaction database, the transaction database being distributed among a first local database associated with a first digital processing system and at least a second local database associated with a second digital processing system, comprising:

(a) determining the number of times a candidate itemset appears in the first local database to establish a local count for the candidate itemset;

(b) exchanging the local counts with the at least second processing system;

(c) using the local count to determine whether the number of times a candidate itemset appears in the transaction database exceeds a predefined minimum support value;

(d) entering a candidate itemset into a set of large itemsets when the number of times exceeds a predetermined minimum support value;

(e) for at least some of the itemsets in the set of large itemsets, determining the number of times selected subsets of the itemsets appear in the transaction database; and (f) outputting an association rule when the ratio of the number of times a selected subset appears in the transaction database to the number of times the associated itemset appears in the transaction database exceeds a predetermined minimum confidence value and thereby satisfies a minimum confidence constraint.

7. The computer implemented method of claim 6, wherein the transaction database is distributed among n processing systems, further comprising:

generating the candidate itemsets by concatenating itemsets in the set of large itemsets in accordance with a predetermined concatenation regime, each of the processing systems being associated with a respective set of 1/n candidate large itemsets;

establishing n−1 receive buffers;

receiving remote portions of the transaction database from the other processing systems in respective receive buffers; and establishing the local counts by determining the number of times one or more of the 1/n candidate large itemsets appear in the remote portions of the transaction database when a receive buffer is full, and otherwise determining the number of times one or more of the 1/n candidate large itemsets appear in the respective local database.

8. The computer implemented method of claim 6, wherein the transaction database is distributed among n processing systems, and wherein the method includes generating a global set G of large itemsets and partitioning the global set G among the n processing systems such that a local set $G^i$ comprising approximately G/n large itemsets is distributed to each system, and each system establishes the local count using the local set $G^i$.

9. A system for determining association rules in a transaction database of itemsets distributed among a plurality of local databases, each being associated with a respective processing system, each processing system including:

a large itemset generator for generating candidate large itemsets in accordance with a predetermined concatenation regime;

a counter for counting the number of times selected of the candidate large itemsets appear in the local database to establish a local count;

an exchanger for exchanging data representative of the local count or local database between the processing system and the other processing systems, wherein the system includes:

at least one rule generator for generating association rules based on the local counts.

10. The system of claim 9, wherein each processing system includes means for entering a candidate itemset into a set of large itemsets when the number of times the candidate large itemset appears in the transaction database exceeds a predetermined minimum support value.

11. The system of claim 10, wherein the rule generator determines, for at least some of the itemsets in the set of large itemsets, the number of times selected subsets of the itemsets appear in the transaction database, and wherein the rule generator outputs an association rule when the ratio of the number of times a selected subset appears in the transaction database to the number of times the associated itemset appears in the transaction database exceeds a predetermined minimum confidence value and thereby satisfies a minimum confidence constraint.

12. The system of claim 11, wherein each processing system includes means for exchanging the local counts with the other processing systems such that each processing system determines whether the number of times a candidate itemset appears in the transaction database exceeds the predefined minimum support value.

13. The system of claim 11, wherein the transaction database is distributed among n processing systems and each processing system further comprises:

means for generating the candidate itemsets by concatenating itemsets in the set of large itemsets in accordance with a predetermined concatenation regime each of the processing systems being associated with a respective set of 1/n candidate large itemsets;

means for establishing n−1 receive buffers for receiving respective remote portions of the transaction database from the other processing systems;

means for establishing the local counts by determining the number of times one or more of the 1/n candidate large itemsets appear in the remote portions of the transaction database when a receive buffer is full, and otherwise determining the number of times one or more of the 1/n candidate large itemsets appear in the respective local database;

means for entering a candidate itemset into a local set of large itemsets when the respective local count exceeds a predetermined minimum support value;

means for transmitting the local set of large itemsets to the other processing systems;

means for receiving from the other processing systems respective remote sets of large itemsets; and means for determining the sum of the local set and the remote sets to establish a global set of large itemsets.

14. The system of claim 11, wherein the transaction database is distributed among n processing systems, and each processing system further comprises:

means for generating a global set G of large itemsets and partitioning the global set G among the n processing systems such that a local set $G^i$ comprising approximately G/n large itemsets is distributed to each processing system, and each processing system establishes the local count using the local set $G^i$.

15. A computer program device comprising:

a computer program storage device readable by a first digital processing system; and a program means on the program storage device and including instructions executable by the digital processing system for performing method steps for identifying frequently recurring itemsets in transactions which are stored in a transaction database, the transaction database being distributed among a first local database associated with the first digital processing system and at least a second local database associated with a second digital processing system, the method steps comprising:

determining the number of times a candidate itemset appears in the first local database to establish a local count for the candidate itemset;

using the local count to determine whether the number of times a candidate itemset appears in the transaction database exceeds a predefined minimum support value;

entering a candidate itemset into a set of large itemsets when the number of times exceeds a predetermined minimum support value, such that the set of large itemsets can be designated as frequently occurring itemsets in transactions;

for at least some of the itemsets in the set of large itemsets, determining the number of times selected subsets of the itemsets appear in the transaction database;

outputting an association rule when the ratio of the number of times a selected subset appears in the transaction database to the number of times the associated itemset appears in the transaction database exceeds a predetermined minimum confidence value and thereby satisfies a minimum confidence constraint; and after establishing the local count, exchanging the local counts with the at least second processing system such that each processing system determines whether the number of times a candidate itemset appears in the transaction database exceeds the predefined minimum support value.

16. The program storage device of claim 15, wherein the transaction database is distributed among n processing systems, and wherein the method steps include generating a global set G of large itemsets and partitioning the global set G among the n processing systems such that a local set $G^i$ comprising approximately G/n large itemsets is distributed to each system, and each system establishes the local count using the local set $G^i$.

17. The program storage device of claim 15, wherein the transaction database is distributed among n processing systems, and the method steps further comprise:

generating the candidate itemsets by concatenating itemsets in the set of large itemsets in accordance with a predetermined concatenation regime, each of the processing systems being associated with a respective set of 1/n candidate large itemsets;

receiving remote portions of the transaction database from the other processing systems; and establishing the local counts by alternatingly determining the number of times one or more of the 1/n candidate large itemsets appear in the respective local database and in the remote portions of the transaction database.

18. The program storage device of claim 17, wherein the method further comprises:

establishing n−1 receive buffers for receiving the remote portions of the transaction database; and establishing the local counts by determining the number of times one or more of the 1/n candidate large itemsets appear in the remote portions of the transaction database when a receive buffer is full, and otherwise determining the number of times one or more of the 1/n candidate large itemsets appear in the respective local database.

19. The program storage device of claim 18, wherein the method steps further comprise:

entering a candidate itemset into a local set of large itemsets when the respective local count exceeds a predetermined minimum support value;

transmitting the local set of large itemsets to the other processing systems;

receiving from the other processing systems respective remote sets of large itemsets; and determining the sum of the local set and the remote sets to establish a global set of large itemsets.

* * * * *

UNITED STATES PATENT AND TRADEMARK OFFICE
CERTIFICATE OF CORRECTION

PATENT NO. : 5,842,200
DATED : November 24, 1998
INVENTOR(S) : Agrawal et al

It is certified that error appears in the above-identified patent and that said Letters Patent is hereby corrected as shown below:

Column 15, line 65, insert a comma between "itemsets" and "the"

Signed and Sealed this

Twenty-fifth Day of May, 1999

Attest:

Q. TODD DICKINSON

*Attesting Officer*  *Acting Commissioner of Patents and Trademarks*